United States Patent
Bolis et al.

(10) Patent No.: US 7,353,654 B2
(45) Date of Patent: *Apr. 8, 2008

(54) METHOD AND APPARATUS FOR ACHIEVING POWER AUGMENTATION IN GAS TURBINES USING WET COMPRESSION

(75) Inventors: Giacomo Bolis, Zürich (CH); Gustav Hagström, Nussbaumen (CH); Jürgen Hoffmann, Untersiggenthal (CH); Thorsten Wasmuth, Rudolfstetten (CH)

(73) Assignee: ALSTOM Technology Ltd, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/860,328

(22) Filed: Jun. 4, 2004

(65) Prior Publication Data

US 2005/0076646 A1 Apr. 14, 2005

Related U.S. Application Data

(63) Continuation of application No. PCT/CH02/00663, filed on Dec. 4, 2002.

(30) Foreign Application Priority Data

Dec. 6, 2001 (GB) .................................. 0129252.3

(51) Int. Cl.
*F02C 3/30* (2006.01)
(52) U.S. Cl. ...................... 60/775; 60/39.3; 60/39.281
(58) Field of Classification Search .................. 60/775, 60/39.3, 39.48, 39.53, 39.59, 39.281
See application file for complete search history.

(56) References Cited

U.S. PATENT DOCUMENTS 986,308 A 3/1911 Ostergren (Continued)

FOREIGN PATENT DOCUMENTS

DE 1 239 888 5/1967

(Continued)

OTHER PUBLICATIONS

S. Brusca et al., "Fogging for Evaporative Cooling Effects on Siemens V94.2 Gas Turbine Performance," Proceedings of IJPGC'02, 2002 International Joint Power Generation Conference, Phoenix, AZ, USA, Jun. 24-26, 2002, IJPGC2002-26189, American Society of Mechanical Engineers.

(Continued)

*Primary Examiner*—William H. Rodriguez
(74) *Attorney, Agent, or Firm*—Steptoe & Johnson LLP

(57) ABSTRACT

A gas turbine unit and method of operation thereof are disclosed. A very quick and easily controllable augmentation or reduction of shaft power produced by the gas turbine unit, in particular of large gas turbine units exhibiting a pressure ratio larger than 15 bar, is achieved by providing at least one liquid droplet injection device on the upstream side of the compressor for injecting liquid into the stream of intake air. The injection device allows the addition of liquid mass flow in the form of liquid droplets corresponding to the desired increase of shaft power. The amount of water mass flow corresponding to the desired increase or decrease of shaft power output is added or reduced in a substantially stepless manner immediately within a time interval determined by design characteristics of the injection device. Water mass flow is preferentially injected substantially across the entire cross-section of the intake air guide.

21 Claims, 6 Drawing Sheets

U.S. PATENT DOCUMENTS

| | | | |
|---|---|---|---|
| 1,265,650 A | 5/1918 | Graemiger | |
| 1,384,570 A | 7/1921 | Schwarz | |
| 2,115,338 A | 4/1938 | Lysholm | 60/42 |
| 2,219,994 A | 10/1940 | Jung | 60/41 |
| 2,322,717 A | 6/1943 | Nettel | 60/41 |
| 2,365,616 A | 12/1944 | Zweifel | 60/42 |
| 2,438,998 A | 4/1948 | Halford | 60/42 |
| 2,469,678 A | 5/1949 | Wyman | 60/42 |
| 2,469,679 A | 5/1949 | Wyman | 60/42 |
| 2,489,683 A | 11/1949 | Stalker | 60/41 |
| 2,648,196 A | 8/1953 | Mullen, II et al. | 60/39.55 |
| 2,657,530 A | 11/1953 | Lee, II | 60/39.28 |
| 2,678,531 A | 5/1954 | Miller | 60/39.05 |
| 2,686,631 A | 8/1954 | Jordan | 230/209 |
| 2,689,452 A | 9/1954 | Jordan | 60/35.6 |
| 2,863,282 A | 12/1958 | Torell | 60/35.6 |
| 2,869,670 A | 1/1959 | Hoffman | 181/35 |
| 2,927,423 A | 3/1960 | Wisniowski | 60/35.6 |
| 2,941,356 A | 6/1960 | Blackman | 60/39.23 |
| 2,974,482 A | 3/1961 | Kelley | 60/39.3 |
| 3,100,964 A | 8/1963 | Bevers et al. | 60/39.3 |
| 3,353,360 A | 11/1967 | Gorzegno | 60/39.18 |
| 3,359,737 A | 12/1967 | Lewis | 60/265 |
| 3,623,668 A | 11/1971 | Freid et al. | 239/265.17 |
| 3,630,030 A | 12/1971 | Wagner | 60/274 |
| 3,693,347 A | 9/1972 | Kydd et al. | 60/39.05 |
| 3,736,074 A | 5/1973 | Kilbane et al. | 417/279 |
| 3,815,356 A | 6/1974 | Burge et al. | 60/204 |
| 3,894,691 A | 7/1975 | Mee | 239/524 |
| 3,936,215 A | 2/1976 | Hoff | 415/11.5 |
| 4,002,023 A | 1/1977 | Hartmann | 60/39.31 |
| 4,036,028 A | 7/1977 | Mandrin | 62/52 |
| 4,199,295 A | 4/1980 | Raffy et al. | 415/115 |
| 4,281,511 A | 8/1981 | Neale | 60/39.53 |
| 4,311,439 A | 1/1982 | Stofen | 417/313 |
| 4,418,527 A | 12/1983 | Schlom et al. | 60/39.05 |
| 4,478,553 A | 10/1984 | Leibowitz et al. | 416/97 R |
| 4,519,207 A | 5/1985 | Okabe et al. | 60/39.182 |
| 4,572,428 A | 2/1986 | Groff et al. | 236/44 A |
| 4,667,465 A | 5/1987 | Munk | 60/39.3 |
| 4,702,074 A | 10/1987 | Munk | 60/39.511 |
| 4,731,990 A | 3/1988 | Munk | 60/39.05 |
| 4,928,478 A | 5/1990 | Maslak | 60/39.05 |
| 5,011,540 A | 4/1991 | McDermott | 134/23 |
| 5,083,423 A | 1/1992 | Prochaska et al. | 60/39.02 |
| 5,191,767 A | 3/1993 | Kane et al. | 60/728 |
| 5,193,976 A | 3/1993 | Kolev et al. | 415/116 |
| 5,203,161 A | 4/1993 | Lehto | 60/39.53 |
| 5,273,395 A | 12/1993 | McDermott | 415/121.3 |
| 5,282,726 A | 2/1994 | Warren | 417/243 |
| 5,313,783 A | 5/1994 | Althaus | 60/39.181 |
| 5,326,254 A | 7/1994 | Munk | 431/115 |
| 5,353,585 A | 10/1994 | Munk | 60/39.05 |
| 5,463,873 A | 11/1995 | Early et al. | 62/121 |
| 5,481,865 A * | 1/1996 | Frutschi | 60/773 |
| 5,496,012 A | 3/1996 | Kenny, III | 251/294 |
| 5,525,268 A | 6/1996 | Reens | 261/78.2 |
| 5,537,813 A | 7/1996 | Davis et al. | 60/39.05 |
| 5,560,195 A | 10/1996 | Anderson et al. | 60/39.07 |
| 5,669,217 A | 9/1997 | Anderson | 60/39.05 |
| 5,689,948 A * | 11/1997 | Frutschi | 60/774 |
| 5,758,485 A * | 6/1998 | Frutschi | 60/772 |
| 5,790,972 A | 8/1998 | Kohlenberger | 701/103 |
| 5,839,269 A * | 11/1998 | Frutschi | 60/783 |
| 5,867,977 A | 2/1999 | Zachary et al. | 60/39.53 |
| 5,884,470 A * | 3/1999 | Frutschi | 60/783 |
| 5,906,095 A * | 5/1999 | Frutschi et al. | 60/775 |
| 5,930,990 A | 8/1999 | Zachary et al. | 60/39.53 |
| 6,038,848 A * | 3/2000 | Frutschi | 60/775 |
| 6,178,735 B1 * | 1/2001 | Frutschi | 60/772 |
| 6,178,738 B1 * | 1/2001 | Frutschi | 60/775 |
| 6,199,363 B1 * | 3/2001 | Frutschi | 60/775 |
| 6,202,399 B1 * | 3/2001 | Frutschi | 60/773 |
| 6,216,443 B1 | 4/2001 | Utamura | 60/39.53 |
| 6,223,523 B1 * | 5/2001 | Frutschi | 60/775 |
| 6,247,302 B1 * | 6/2001 | Tsukamoto et al. | 60/39.511 |
| 6,250,064 B1 | 6/2001 | Timlinson et al. | 60/39.05 |
| 6,256,976 B1 * | 7/2001 | Kataoka et al. | 60/775 |
| 6,260,350 B1 | 7/2001 | Horii et al. | 60/39.3 |
| 6,286,301 B1 * | 9/2001 | Utamura | 60/39.53 |
| 6,357,236 B1 | 3/2002 | Utamura | 60/728 |
| 6,363,709 B2 * | 4/2002 | Kataoka et al. | 60/775 |
| 6,378,284 B1 * | 4/2002 | Utamura | 60/775 |
| 6,389,799 B1 | 5/2002 | Hatamiya et al. | 60/39.3 |
| 6,397,578 B2 * | 6/2002 | Tsukamoto et al. | 60/39.511 |
| 6,463,741 B1 * | 10/2002 | Frutschi | 60/780 |
| 6,470,668 B2 | 10/2002 | Payling et al. | 60/39.3 |
| 6,484,508 B2 | 11/2002 | Rocklin et al. | 60/775 |
| 6,530,210 B2 | 3/2003 | Horii et al. | 60/39.53 |
| 6,568,167 B2 | 5/2003 | Horii et al. | 60/39.281 |
| 6,568,168 B2 | 5/2003 | Horii et al. | 60/39.3 |
| 6,581,368 B2 | 6/2003 | Utamura | 60/39.3 |
| 6,598,401 B1 | 7/2003 | Utamura | 60/775 |
| 6,598,402 B2 * | 7/2003 | Kataoka et al. | 60/775 |
| 6,609,360 B2 | 8/2003 | Utamura | 60/39.092 |
| 6,634,165 B2 | 10/2003 | Tomlinson et al. | 60/39.3 |
| 6,640,550 B2 | 11/2003 | Hoffmann et al. | 60/785 |
| 6,705,074 B2 | 3/2004 | Horii et al. | 60/39.53 |
| 6,711,888 B2 | 3/2004 | Horii et al. | 60/39.3 |
| 6,715,916 B2 | 4/2004 | Tomlinson et al. | 374/144 |
| 6,779,332 B2 | 8/2004 | Horii et al. | 60/39.3 |
| 6,805,483 B2 | 10/2004 | Tomlinson et al. | 374/144 |
| 6,935,119 B2 | 8/2005 | Placko et al. | 60/775 |
| 6,938,405 B2 | 9/2005 | Carberg et al. | 60/39.53 |
| RE38,831 E | 10/2005 | Horii et al. | 60/39.3 |
| 6,973,772 B2 | 12/2005 | Hatamiya et al. | 60/39.511 |
| RE39,092 E | 5/2006 | Horii et al. | 60/39.53 |
| 7,040,083 B2 | 5/2006 | Horii et al. | 60/39.3 |
| 7,104,749 B2 | 9/2006 | Frutschi | 415/1 |
| 7,104,750 B2 | 9/2006 | Bolis et al. | 415/116 |
| 7,146,794 B2 | 12/2006 | Hatamiya et al. | 60/39.511 |
| 2001/0039794 A1 | 11/2001 | Rocklin et al. | 60/39.05 |
| 2001/0042381 A1 * | 11/2001 | Dodo et al. | 62/238.3 |
| 2002/0083712 A1 | 7/2002 | Tomlinson et al. | 60/775 |
| 2004/0025491 A1 | 2/2004 | Hoffmann et al. | 60/39.182 |
| 2004/0103667 A1 | 6/2004 | Frutschi | 60/775 |
| 2004/0105755 A1 | 6/2004 | Bolis et al. | 415/116 |
| 2004/0112037 A1 * | 6/2004 | Yagi et al. | 60/39.3 |
| 2004/0213675 A1 | 10/2004 | Blangetti et al. | 416/241 R |
| 2004/0221584 A1 | 11/2004 | Hoffmann et al. | 60/782 |
| 2005/0066664 A1 * | 3/2005 | Shibata et al. | 60/775 |
| 2005/0076646 A1 | 4/2005 | Bolis et al. | 60/775 |
| 2005/0081529 A1 | 4/2005 | Bolis et al. | 60/775 |
| 2005/0109033 A1 | 5/2005 | Braun et al. | 60/772 |
| 2005/0141991 A1 | 6/2005 | Frutschi | 415/144 |
| 2005/0279101 A1 | 12/2005 | Hoffmann et al. | 60/775 |
| 2006/0137356 A1 | 6/2006 | Jimenez Haertel et al. | 60/775 |
| 2006/0218931 A1 | 10/2006 | Haertel et al. | 60/775 |
| 2007/0113561 A1 | 5/2007 | Bolis et al. | 60/775 |

FOREIGN PATENT DOCUMENTS

| | | | |
|---|---|---|---|
| DE | 198 52 060 A1 | | 5/2000 |
| DE | 199 00 026 A1 | | 7/2000 |
| DE | 199 61 383 A1 * | | 6/2001 |
| DE | 101 16 117 A1 * | | 10/2002 |
| DE | 101 53 911 A1 | | 5/2003 |
| DE | 102 07 197 A1 | | 9/2003 |
| DE | 102 54 721 A1 | | 6/2004 |
| EP | 0 789 134 A2 * | | 1/1997 |
| EP | 0 770 771 A1 | | 5/1997 |
| EP | 0 781 909 A2 | | 7/1997 |
| EP | 0 899 438 A1 * | | 8/1997 |
| EP | 0 887 530 A2 | | 12/1998 |

| | | |
|---|---|---|
| EP | 0 889 212 A2 | 1/1999 |
| EP | 0 978 635 A1 * | 2/2000 |
| EP | 0 990 780 A1 | 4/2000 |
| EP | 1 108 870 A2 | 6/2001 |
| EP | 1 205 640 A2 | 5/2002 |
| EP | 1 225 306 A1 | 7/2002 |
| EP | 1422 403 A1 * | 11/2003 |
| FR | 1563749 | 4/1969 |
| GB | 2 280 224 A | 1/1995 |
| JP | 56-43433 | 9/1981 |
| JP | 61-37794 | 11/1986 |
| JP | 61-283723 | 12/1986 |
| JP | 63-248931 | 10/1988 |
| JP | 2-211331 | 8/1990 |
| JP | 5-195809 | 8/1993 |
| JP | 6-10702 | 1/1994 |
| JP | 7-97933 | 4/1995 |
| JP | 2004-176717 * | 6/2004 |
| WO | WO 97/43530 | 11/1997 |
| WO | WO 98/48159 | 10/1998 |
| WO | WO 99/67519 | 12/1999 |
| WO | WO 00/50739 | 8/2000 |
| WO | WO 03/038256 A1 | 5/2003 |
| WO | WO 03/071113 A1 | 8/2003 |
| WO | WO 2004/051062 A1 | 6/2004 |

OTHER PUBLICATIONS

Elliott Smith et al., "Wet Compression for Gas Turbines: Power Augmentation and Efficiency Upgrade," Proceedings of the American Power Conference, Apr. 10-12, 2000, Chicago, Illinois Institute of Technology, vol. 62, p. 106-111.
Drew Robb, "Specifying and Installing High-Pressure Fog Systems," *Power Engineering*, Apr. 2000, p. 48-51.
Thomas R. Mee III, "Inlet Fogging Augments Power Production," *Power Engineering*, Feb. 1999, p. 26-30.
Jean-Pierre Stalder, "Gas Turbine Compressor Washing State of the Art—Field Experiences," presented at the International Gas Turbine & Aeroengine Congress & Exhibition, Stockholm, Sweden, Jun. 2-5, 1998, published by the American Society of Mechanical Engineers, Paper 98-GT-420.
Stephen J. Molis et al., "Capacity Enhancement for Simple and Combined Cycle Gas Turbine Power Plants," Power-Gen International '97, Sep. 25, 1997.
A. P. Tarabrin et al., "An Analysis of Axial Compressors Fouling and a Cleaning Method of Their Blading," presented at the International Gas Turbine and Aeroengine Congress & Exhibition, Birmingham, UK, Jun. 10-13, 1996, published by the American Society of Mechanical Engineers, Paper 96-GT-363.
*Gas Turbine and Combined Cycle Capacity Enhancement, Second Interim Report*, EPRI TR-104612, Jan. 1995, p. 2-13, 3-6, 3-7, 4-5, 4-11, 4-16, 4-33, 4-78, 4-88, and 4-89.
J. Kevin Cross et al, "Modeling of Hybrid Combustion Turbine Inlet Air Cooling Systems," ASHRAE Transactions: Symposia, vol. 101, Part 2, Technical and Symposium Papers Presented at the 1995 Annual Meeting, San Diego, CA, 1995, p. 1335-1341.
Thomas Robinson, "Water Injected LM 1600 Installation and Operating Experience," presented at the International Gas Turbine and Aeroengine Congress and Exposition, The Hague, Netherlands, Jun. 13-16, 1994, published by the American Society of Mechanical Engineers, Paper 94-GT-451.
J. De Ruyck et al., "An Externally Fired Evaporative Gas Turbine Cycle for Small Scale Biomass CHP Production," IGTI-vol. 9, ASME Cogen-Turbo power congress and exposition: gas turbines in cogeneration and utility, industrial and independent power generation, Portland, Oregon, Oct. 25-27, 1994, p. 631-640, ASME, 1994.
*Gas Turbine and Combined-Cycle Capacity Enhancement, Interim Report*, EPRI TR-102412, Oct. 1993, p. 4-18 and 4-19.
"On line washing gives firm output gains for UNA," *Turbomachinery International*, May/Jun. 1993.
Hugh M. Henneberry et al., Analysis of Gas Turbine Engines Using Water and Oxygen Injection to Achieve High Mach Numbers and High Thrust, NASA Technical Memorandum 106270, NASA, Jul. 1993.
Luke H. Rogers et al., "Performance Calculations and Research Direction for a Water Enhanced Regenerative Gas Turbine Cycle," presented at the Intersociety Energy Conversion Engineering Conference held Aug. 8-13, 1993 in Atlanta, Georgia, sponsored by the American Chemical Society, and published by SAE in the Proceedings of the 28th Intersociety Energy Conversion Engineering Conference, vol. 1, pp. 1.949-1.954.
W. Krakowitzer et al., "GT13E2 with annular combustor will boost Deeside efficiency," *Modern Power Systems*, May 1992.
Eric Jeffs, "Compressor washing on line for large gas turbines," *Turbomachinery International*, Sep./Oct. 1992.
J. P. Nolan et al., "Gas Turbine Performance Improvement Direct Mixing Evaporative Cooling System American Atlas Cogeneration Facility Rifle, Colorado," presented at the Gas Turbine and Aeroengine Congress and Exposition held Jun. 11-14, 1990 in Brussels, Belgium, published by the American Society of Mechanical Engineers, Paper 90-GT-368.
Gary L. Haub et al., "Field Evaluation of On-Line Compressor Cleaning in Heavy Duty Industrial Gas Turbines," 1990, American Society of Mechanical Engineers Paper 90-GT-107.
B. M. Barnum et al., "Gas Turbine Performance Deterioration and Water Wash Frequency," 1981, published by the American Society of Mechanical Engineers, Paper 81-JPGC-GT-10.
Kawabata, "Turbine Generator," Jun. 2, 1981.
R. V. Kleinschmidt, "Value of Wet Compression in Gas-Turbine Cycles," *Mechanical Engineering*, 69(2), pp. 115-116 Feb. 1947 (see also The Engineers' Digest (British), V. 8(8), Aug. 1947, p. 270-71.
J. van Liere et al., "Retrofit of gas turbines by SwirlFlash® over-spray," undated.
"WAC Water Atomization Cooling System for Economical Power Boosting of Land Based Gas Turbine." Hitachi WAC System, Hitachi, Ltd., undated.
EPRI Technical Brief, "EPRI Technology to Enhance Combustion Turbine Output," undated.
U.S. Appl. No. 11/469,845, filed Sep. 1, 2006.
Amendment filed Jul. 12, 2007 for U.S. Appl. No. 11/469,842.
Amendment filed Jul. 12, 2007 for U.S. Appl. No. 10/860,329.
Second Preliminary Amendment filed Jul. 12, 2007 for U.S. Appl. No. 11/469,845.
International Search Report for PCT application No. PCT/CH02/00663.
International Preliminary Examination Report for PCT application No. PCT/CH02/00663.
British search report for British application No. GB 0129252.3.
International Search Report for PCT application No. PCT/CH02/00664.
International Preliminary Examination Report for PCT application No. PCT/CH02/00664.
British search report for GB 0129251.5.

* cited by examiner

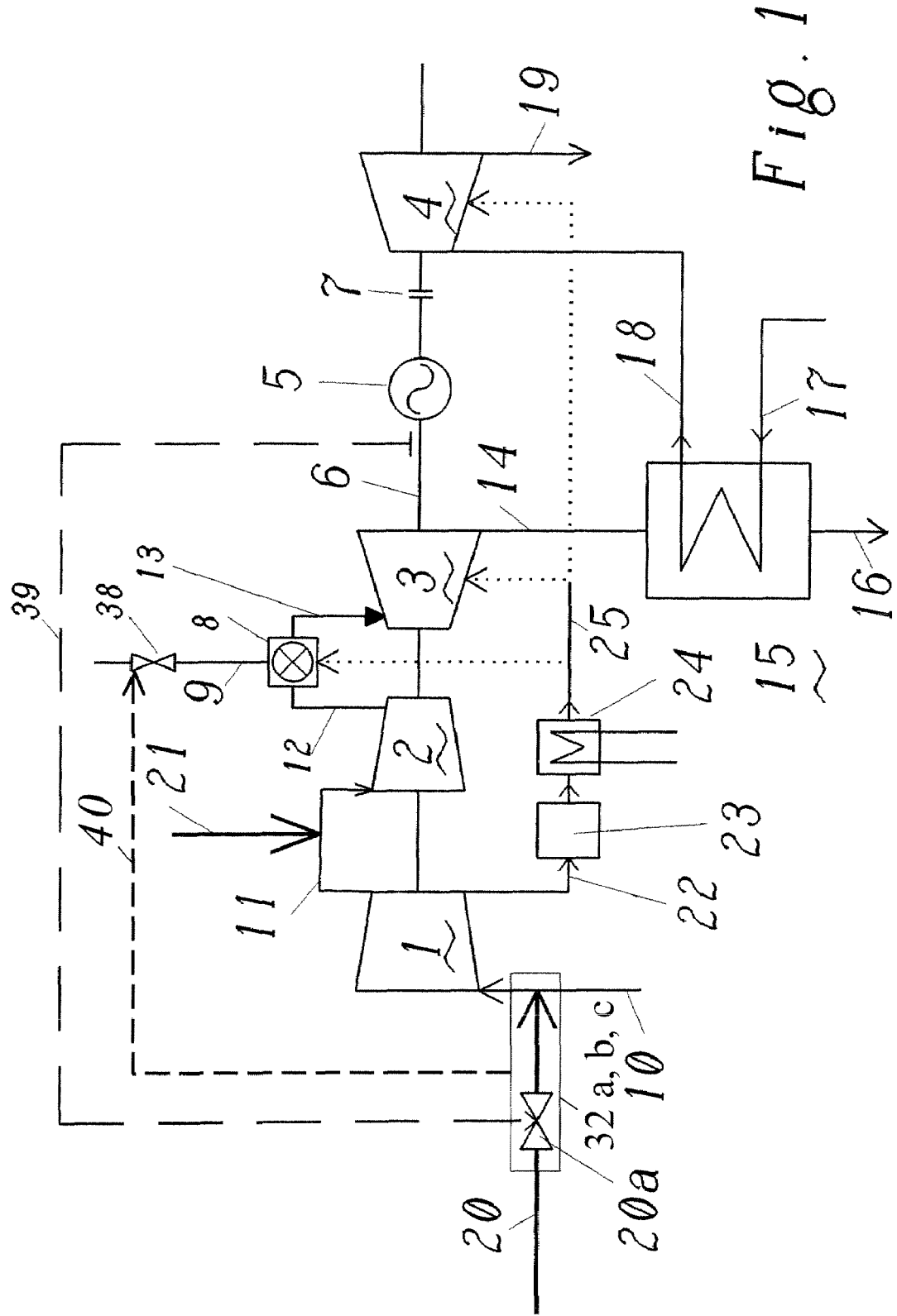

METHOD AND APPARATUS FOR ACHIEVING POWER AUGMENTATION IN GAS TURBINES USING WET COMPRESSION

CROSS-REFERENCE TO RELATED APPLICATIONS

This application is a continuation of the U.S. National Stage designation of co-pending International Patent Application PCT/CH02/00663 filed Dec. 4, 2002, the entire content of which is expressly incorporated herein by reference thereto.

FIELD OF THE INVENTION

The present invention relates to a gas turbine unit as well as to a method of operating a gas turbine unit both using over-fogging. More particularly it concerns a gas turbine unit essentially comprising: a compressor for compressing intake air supplied thereto and discharging the compressed air; a combustion chamber in which fuel is combusted with the compressed air discharged from said compressor; a turbine driven by the hot combustion air discharged from said combustion chamber.

BACKGROUND OF THE INVENTION

It is well known that the addition of water, or other suitable liquids or mixtures of liquids, into the working medium of gas turbines can be used for increasing the power that can be generated by gas turbine units. The increase of available power is due to, among other reasons, the cooling effect of the added water reducing the compressor power consumption and allowing an increased firing of the gas turbine unit, as well as due to the increased mass flow passing the turbine blades.

Water can be added either in the form of vapour, that is in the form of humidified air or, and this relates to the present invention, in the form of small liquid droplets, i.e. water can be added above the saturation level of water in the air. This technique, known as over-fogging, is usually carried out by adding liquid droplets of particular size to the air stream entering the compressor of the gas turbine unit (so-called 'wet compression'). 'Wet compression' allows to increase the power available due to the reduction of work required for compression of the inlet air, as the latent heat for evaporation of this water cools the inlet air stream when it passes the compressor stages.

There are a number of documents describing particular designs of gas turbine units and methods for their operation using 'wet compression'. For example U.S. Pat. No. 5,930,990 as well as its continuation-in-part U.S. Pat. No. 5,867,977 describe an apparatus for 'wet compression' as well as a method for increasing the power available by using 'wet compression'. These documents concern gas turbine units, where small droplets of water are being added to the intake air entering the compressor. The increase of added water is carried out in a stepwise, incremental manner, and due to problems of thermal non-equilibrium induced in the components of the gas turbine unit downstream of the injection (thermal shock leading to cracking in certain alloyed components and to undesired reduction of clearance between parts which are in motion relative to each other during operation), this stepwise addition of water is proposed to be carried out on a timescale of 10-20 minutes. Additionally the proposed means for adding the water are designed like a grid of nozzles lying in one plane and being arranged substantially perpendicular to the direction of flow of the intake air stream. This stepwise increase of water added to the intake air can, according to this document, be achieved by either increasingly feeding the nozzles with water or by systematically feeding more and more nozzles with water (sequential increase in time or in position).

In order to control and to optimize the addition of water when using wet compression, WO 00/50739 proposes a particular apparatus for monitoring destructive 'wet compression' power augmentation-related casing distortions in gas turbine units. Also this document points out that in order to avoid thermal stress when activating 'wet compression', the addition of water has to be carried out smoothly under a careful monitoring of the associated distortions of the casing and other components of the gas turbine unit.

Another particular device to be used for 'wet compression' is proposed in U.S. Pat. No. 6,216,443. The water is added by means of a liquid droplet injection device provided on the upstream side of a compressor, and on the downstream side of a silencer. The addition of water is controlled by means of a valve, and it is also pointed out that due to thermal stress and due to the fact that concomitantly other parameters have to be adjusted when adding water to the intake air (for example the addition of fuel has to be adjusted), the addition has to be performed sufficiently slowly.

SUMMARY OF THE INVENTION

The present invention therefore relates to providing a gas turbine unit as well as a method for its operation allowing a simple and constructively easy augmentation of the available shaft power of the gas turbine unit by using over-fogging, i.e. by injecting liquid droplets into the stream of intake air upstream of the compressor. More particularly, this aim shall be achieved for a gas turbine unit, essentially comprising: a compressor for compressing intake air supplied thereto and discharging the compressed air; a combustion chamber in which fuel is combusted with the compressed air discharged from said compressor; a turbine driven by the hot combustion air discharged from said combustion chamber.

More particularly, the invention relates to gas turbine units, the compressor of which is working with a pressure ratio larger than 15 bar (i.e. the process is aiming mainly at, but not limited to large gas turbine units, and preferentially, the pressure ratio is even larger than 20 bar), by providing at least one liquid droplet injection device on the upstream side of said compressor for injecting liquid into the stream of intake air in order to increase the shaft power generated by the gas turbine unit, wherein the amount of liquid mass flow corresponding to the desired increase or decrease of shaft power output of the gas turbine unit is added or reduced in the form of liquid droplets immediately, i.e. within a time interval that is determined by the design characteristics of the liquid droplet injection device to increase or decrease the liquid droplet mass flow, and in a substantially stepless manner, and wherein preferentially said liquid mass flow is injected substantially across the entire cross-section of the air intake.

The liquid injected preferentially consists substantially or completely of water. The water may be demineralized to avoid detrimental formation of deposit and scale, and/or may contain additives in particular to prevent the formation of deposit. For simplicity and clarity, in the following the term water shall be used meaning generally liquid, which leads to the desired effect when injected upstream of the compressor.

When talking about "immediately, i.e. within a time interval that is determined by the design characteristics of the liquid droplet injection device", that "immediately" means substantially as quickly as possible within the bounds predetermined by the design (tube widths, control and valve speed etc.) of the injection device. The term "immediately" or "immediate" shall in the following stand in the above sense.

Contrary to all expectations of the person skilled in the art and contrary to all statements found in the state of the art, an immediate and stepless addition or reduction of water mass flow when using over-fogging is possible without the deleterious effects mentioned in the above cited documents. Surprisingly, immediate and complete switching-on or switching-off of the liquid droplet injection device is possible without waiting for steady state conditions in the gas turbine by using slowly increasing or decreasing amounts of water. If it is additionally preferentially made sure that the droplets are added to the stream of intake air substantially across the entire cross-section of the intake air guide, the switching-on and switching-off can basically be carried out in an on/off-manner. This unexpectedly possible fast and simple switching leads to a number of possible constructional simplifications and other advantages. On the one hand no complicated control and regulation means need to be provided for the liquid droplet injection device, and a simple on/off-control is sufficient thereby reducing costs as well as possible sources of failure. On the other hand the shaft power-augmentation/reduction effect of the gas turbine unit is available much more quickly than when using some particular, slow (stepwise) slope for increasing or decreasing the water addition.

According to a first preferred embodiment of the present invention, the gas turbine unit additionally comprises a cooling system which uses compressed or partially compressed air discharged from the compressor for cooling components of the gas turbine unit, wherein the cooling system comprises a cooling unit that is controlled such as to ensure substantially constant quality of the cooled cooling air. Cooling systems for gas turbine units are highly sophisticated systems that have to be carefully controlled. Any change in the mode of operation of the gas turbine leads to a consequential change of the conditions within the compressor and to a corresponding change of the air entering the cooling system. To avoid flow-back of the cooling medium and to assure effective and sufficient cooling of the components that are being cooled by the cooling system, the cooling system is usually controlled with respect to temperature as well as pressure. Using conventional 'wet compression' start-up schemes, the cooling system has to be heavily controlled and actively guided. In particular, the cooling unit has to be controlled in reaction to the slow (stepwise) increase of water addition in order to keep pressure and temperature of the cooling medium downstream of the cooling unit at the desired levels i.e. within the desired limits. Surprisingly, the simplified immediate and stepless addition or reduction of water for 'wet compression' as proposed according to the present invention also considerably simplifies the control of the cooling system. The control of the cooling system can basically be reduced to a single feed forward signal synchronized to the on/off-control of the liquid droplet injection device (if need be the signals of the two systems can be slightly displaced relative to each other in order to take account of hysteresis-effects of the gas turbine unit). In other words it is possible to design the gas turbine unit such that the at least one injection device can be controlled in an on/off-manner only, and that preferably the cooling unit can be controlled with a single signal. It is however also possible to have certain discrete levels of desired power augmentation or reduction of the gas turbine unit and to have on/off-possibilities corresponding to these levels for the two systems only.

As the single feed forward signal for the cooler is necessary anyway for the case of an emergency shut down of the injection system, the proposed gas turbine unit clearly is a simplification of the turbine control system thus increasing reliability and reducing the occurrence of possible errors.

According to another preferred embodiment of the present invention, the gas turbine unit comprises a fuel (gas or oil) control valve that adjusts the fuel mass flow in order to maintain the desired firing temperatures of the gas turbine unit. The fuel control valve is subject to a complicated control mechanism of the gas turbine unit control system, its actual position depending on numerous parameters, for example, but not limited to the compressor discharge conditions. Accordingly, to prevent over-firing of the gas turbine unit with subsequent deleterious effects on the combustion chamber and turbine blade components, the fuel control valve needs to be heavily controlled and actively guided, if water is added in a slow, stepwise manner, since in reaction to such addition of liquid water droplets results in a significant change of the compressor discharge temperature. In this regard it shall be mentioned that over-firing of the gas turbine unit may not only occur when decreasing the liquid injection mass flow, resulting in an increase of the compressor discharge temperature, but also when increasing the liquid injection mass flow, resulting in a decrease of the compressor discharge temperature, due to overshooting effects of the fuel valve control system. The present invention allows to reduce the control interventions of the existing control of the fuel valve using one simple feed forward signal.

According to a further preferred embodiment of the present invention, the gas turbine unit additionally comprises the ability to rapidly increase the power output of the unit using the immediate and stepless addition or reduction of liquid mass flow. This is particularly applicable, but not limited to the case of the power generated by the gas turbine unit being converted into electricity with a generator and being fed into an electricity grid of electricity generators and consumers. When the electricity grid is subject to a fast increase or decrease in power demand caused by e.g. switching on or off of large consumers or a fast decrease in power generation capacity caused by e.g. the emergency shut-down of a large power generation unit, the frequency of the electricity grid drops or rises and an immediate increase or decrease in power generation capacity within seconds or a few minutes is needed in order to maintain the electricity grid frequency reasonably stable and to prevent breakdown of parts of or even of the complete electricity grid. The ability of a particular gas turbine unit to rapidly increase or decrease the power output in a situation of low or high electricity grid frequency is also known as its ability to be operated in 'frequency response' mode. The current invention provides means to rapidly, i.e. on a seconds time scale increase or decrease the power output of the gas turbine unit significantly, e.g. by 10% of its full load capacity, by immediate and stepless addition of water mass flow into the intake air stream. Even more particularly, when the electricity grid frequency drops, also the shaft speed of the gas turbine unit is reduced by the corresponding amount, assuming the gas turbine unit comprises a single shaft arrangement, reason being that the shaft of the gas turbine unit is coupled with the shaft of the electricity generator, and that the shaft speed of the generator is synchronized to the frequency of the electricity grid. In case of a reduced shaft speed, the surge margin, which defines the limit for stable operation of the compressor of gas turbine units, tends to be reduced, limiting the ability of the gas turbine unit to increase its power output or even forcing it to reduce its power output in order to prevent destructive compressor surge, thus worsening the generation capacity situation of the electricity grid. The liquid injection means according to the present invention substantially improves the ability of a gas turbine unit to rapidly increase power output even in case of a reduced shaft speed in that way that by immediate and stepless addition of water, the surge margin of the compressor of the gas turbine unit is increased by cooling the compressor blade section.

According to another preferred embodiment of the present invention the gas turbine unit additionally comprises an intake manifold situated upstream of said compressor and an intake duct situated upstream of said intake manifold connected to said intake manifold by means of an expansion joint, and the liquid droplet injection device is essentially situated at the expansion joint between the intake duct and the intake manifold, wherein preferably the intake duct additionally comprises a silencer located upstream of said liquid droplet injection device and a filter located essentially at the intake opening of the intake duct, and wherein preferably additional cooling means for cooling the intake air are situated downstream of the filter. Locating the liquid droplet injection device close to the or at the expansion joint proves to be particularly advantageous, as the droplets can be evenly distributed across the cross-section, the droplets can be generated in a very small size and the liquid droplet injection device can be easily installed and maintenance is kept simple. According to still another preferred embodiment, the liquid droplet injection device consists of a grid of fogging water ducts, preferably arranged in an essentially parallel manner on a carrying rack, on the downstream side of which fogging water ducts fogging nozzles are mounted for injecting droplets into the stream of intake air, wherein preferably the liquid droplet size injected by the liquid droplet injection device is in the range of 2 to 40 µm, preferably around 10 µm. Preferably, the spacing of the fogging water ducts as well as the spacing of the fogging nozzles mounted on said fogging water ducts is adapted to the flow of intake air to achieve even droplet distribution in the stream of intake air. Preferentially the nozzles are binary nozzles fed with gas or quasi-gas and liquid.

According to yet another preferred embodiment of the present invention, the liquid droplet injection device is located even closer to the compressor inlet, preferably at the compressor bellmouth. This minimization of the distance of the position of droplet injection to the compressor inlet is advantageous, since it widely prevents secondary droplet formation, growing size of the injected droplets due to conglomeration, water loss on the walls or other fixed equipment in the intake manifold as well as centrifugal effects due to deflection of the inlet air stream.

As concerns the cooling system, according to another preferred embodiment, the cooled cooling air is controlled to have a temperature around 300 and 400 degree Celsius, preferably between 330 and 380 degree Celsius allowing a tolerance of less than +/−10 degree Celsius, wherein a pressure in the range of 15 to 40 bar, preferably in the range of 20 to 30 bar is maintained. Even for cooling systems with such small tolerances, the switching on/off of the overfogging according to the present invention is possible.

Further preferred embodiments of the gas turbine unit according to the present invention are described in the dependent claims.

Additionally, the present invention concerns a process for achieving an increase or decrease in shaft power production from a gas turbine unit, which gas turbine unit essentially comprises: a compressor for compressing intake air supplied thereto and discharging the compressed air; a combustion chamber in which fuel is combusted with the compressed air discharged from said compressor; a turbine driven by the hot combustion air discharged from said combustion chamber. In accordance with the above gas turbine unit according to the invention, said process is characterized in that said compressor is working with a pressure ratio larger than 15 bar (i.e. the process is aiming mainly at, but not limited to large gas turbine units, and preferentially the pressure ratio is even 20 bar), and that by means of at least one liquid droplet injection device provided on the upstream side of said compressor liquid is injected into the stream of intake air in order to increase the shaft power generated by the gas turbine unit, wherein said injection is carried out by means of an immediate and stepless addition or reduction of liquid mass flow in the form of liquid droplets corresponding to the desired increase or decrease respectively of power of the gas turbine unit, and wherein preferentially said water mass flow is being injected substantially across the entire cross-section of the intake air guide. As pointed out above, surprisingly, immediate and complete switching-on or switching-off of the liquid droplet injection device is possible without waiting for steady state conditions in the gas turbine by using slowly increasing or decreasing amounts of liquid. Provided that the droplets are added to the stream of intake air substantially across the entire cross-section of the intake air guide, the switching-on/off can even more easily basically be carried out in an on/off-manner.

According to the first preferred embodiment of the process according to the present invention, the gas turbine unit additionally comprises a cooling system which uses compressed or partially compressed air discharged from the compressor for cooling components of the gas turbine unit, wherein the cooling system comprises a cooling unit which is being controlled depending on the quality of the cooled cooling air. Cooling systems of large gas turbine units are highly sophisticated devices which necessitate very accurate control in order to ensure that constant conditions can be maintained at the locations where the cooling medium is used. Accordingly, if the liquid droplet injection device is switched on using an incremental scheme, also the cooling device has to be controlled in accordance with the incrementally changing conditions in the compressor where the cooling air is branched off from. Preferably said process is being carried out using a gas turbine unit as it has been described above.

According to another preferred embodiment of said process, between 0.5 and 5 mass. %, preferably between 1.0 and 3.0 mass % of water are injected into the intake air to achieve an increase of power of the gas turbine unit of e.g. up to 10%. Preferably, water is injected at a pressure of up to 250 bar, preferentially between 100 to 180 bar, and even more preferably at a pressure of around 140 bar water pressure, and this pressure is built up immediately within 1 s and 60 s, preferably within in the range of 10-30 s.

For starting up of the gas turbine unit, it is proposed to in a first step start up the gas turbine to full load, in case of additional cooling systems to switch on these cooling systems, and to, after the expiration of a delay of in the range of 15 to 45 minutes, preferably in the range of 30 minutes, add water by means of the liquid droplet injection device.

Further preferred embodiments related to the process for achieving an increase in power production from a gas turbine unit are described in the dependent claims.

The present invention additionally comprises uses of the above-mentioned gas turbine unit in the field of electricity generation and in the field of production of mechanical power generation.

BRIEF DESCRIPTION OF THE DRAWINGS

The invention, its nature as well as its advantages, shall be described in more detail below with the aid of the accompanying drawings. Referring to the drawings:

FIG. 1 is a schematic view of a gas turbine unit and a heat recovery steam generator, showing the location of the liquid droplet injection device as well as the possible cooling ducts;

DETAILED DESCRIPTION OF THE PREFERRED EMBODIMENTS

Figure 2A:
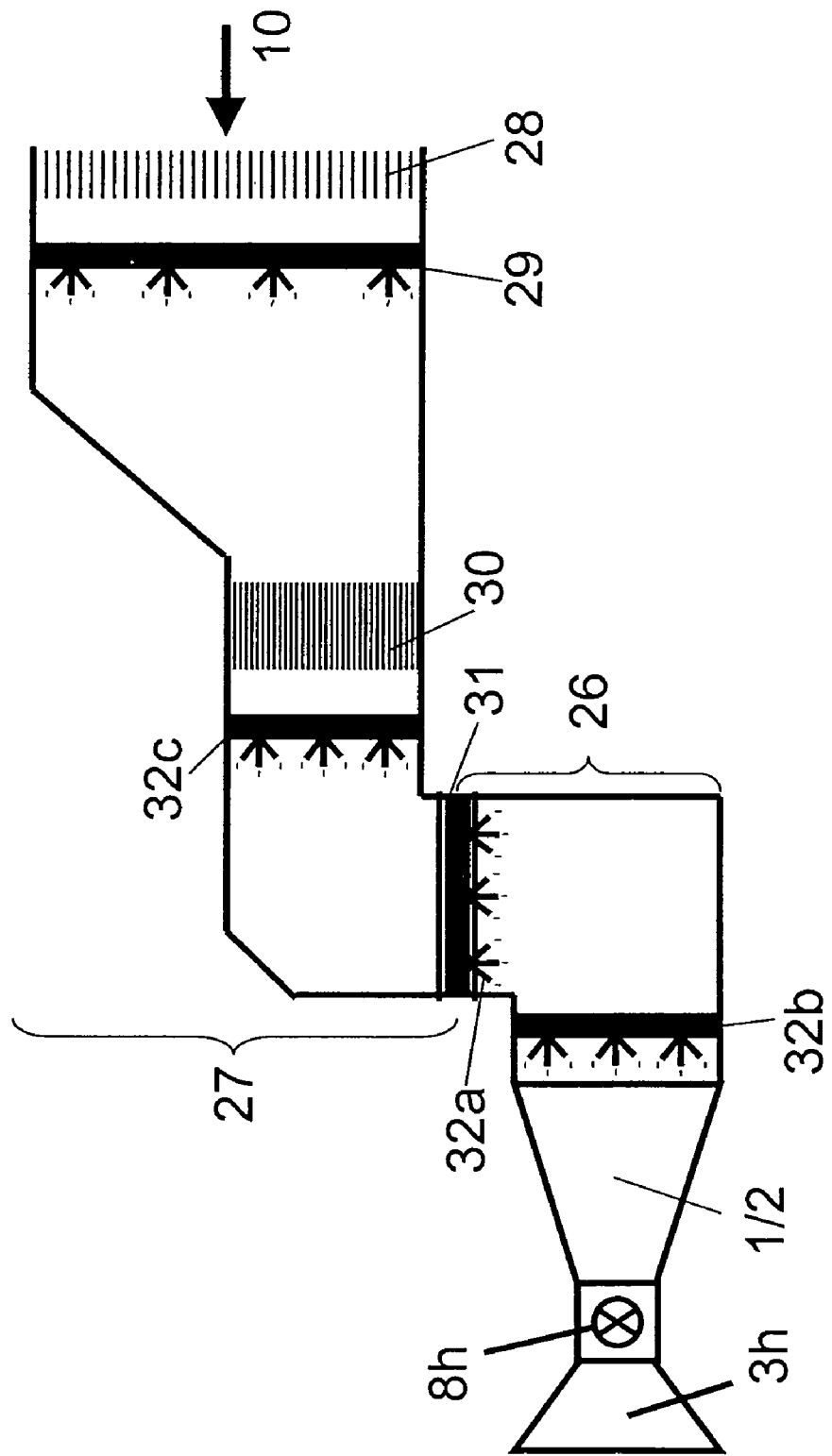
FIGS. 2a and 2b are schematic views of the intake region of a gas turbine unit.

FIG. 1 shows a schematic view of a gas turbine unit. Intake air 10 enters the compressor 1/2, which in this particular case is divided into a first stage 1 operating at low-pressure and a second stage 2 operating at high-pressure. The partially compressed intake air 11 exits the first stage 1 to be fed into the second, high-pressure stage 2. The partially compressed air 11 can be cooled prior to entering the high-pressure stage 2 by cooling means 21 in order to increase the power of the gas turbine unit (so-called intercooling). After full compression of the intake air, the compressed air 12 enters the combustion chamber 8. This combustion chamber 8 is fuelled by a duct 9, and the hot air 13 discharged from the combustion chamber 8 is fed into the turbine stage 3. The exhaust air 14 discharged by the turbine 3 can then either be discharged directly via a chimney to the surrounding or it can, as displayed in FIG. 1, be used in a heat recovery steam generator 15 to generate steam for a steam turbine 4 and then be discharged via a chimney 16. In the latter case water 17 is fed into a duct system in the heat recovery steam generator (steam drums, evaporators, economizers etc) for the generation of steam 18 to be fed into the steam turbine 4. The steam exiting the steam turbine 4 is then either discharged to the surrounding or can be recycled by means of a condenser to re-enter the heat recovery steam generator 15.

FIG. 1 displays a so-called single shaft gas turbine, i.e. a gas turbine where compressor 1/2, gas turbine 3 as well as a generator 5 and a steam turbine 4 are mounted on one single shaft 6. Possibly, clutches allow the de-coupling of some of these units from each other.

Also displayed in this schematic diagram are the cooling means for cooling components of the gas turbine unit. Usually, partially or filly compressed cooling air 22 is branched off from either a stage of the compressor within the compressor or at the end of the compressor. As the compression process in the compressor results in a substantial heating of the compressed air, this air has to be, for cooling purposes, cooled down to the desired temperature levels. To this end, a cooling unit 24 is provided in the cooling air ducts upstream of the locations where the cooling air 25 is to be injected. The cooling unit 24 can have various designs, like for example conventional heat exchangers. In order to avoid the deposition and/or condensation of liquid (particularly critical if heavy over-fogging is being applied upstream of the compressor) in the cooling air ducts, a droplet separator 23 (e.g. centrifugal separator) may be provided in the ducts preferably upstream of the cooling unit 24, but also at any other location where the deposition of liquid shall be particularly prevented. The cooling air can be used at various positions as displayed in FIG. 1, e.g. for cooling the combustion chamber 8, for cooling the turbine 3 as well as 4 etc. If need be, the cooling air can be mixed with steam to enhance the cooling effect.

In order for the cooling system to work properly, the cooling system has to be balanced such as to meet certain conditions. First the pressure in the cooling ducts has to be larger than the pressure at the location where the cooling air is to be injected to avoid flow-back of the cooling air into the cooling ducts. That is the reason why usually cooling air is not just taken from the surrounding but rather branched off from the compressor where high pressure is already available (this, as mentioned above, with the inherent drawback that the air is not available at ambient temperature due to the compression process). Secondly the temperature of the cooling air may not exceed a certain level in order to allow effective cooling of the components where the cooling air is injected. Usually, the tolerances as concerns temperature as well as pressure in these cooling systems are very low necessitating sophisticated control mechanisms to stabilize and balance temperature as well as pressure of the cooling air.

Usually the cooling air has a temperature of 300 to 600 degrees Celsius and a pressure in the range of 10 to 30 bar at the point of discharge from the compressor. Typical are pairs of 400 degrees Celsius at 20 bar or 500 degrees Celsius at 30 bar (to compare: the compressed air 12 fed into the combustion chamber usually has a temperature of about 500 degrees Celsius). The cooling air downstream of the cooling unit 24 shall have a temperature in the range of 300 to 400 degrees Celsius, preferably temperatures in the range of 330 and 380 degrees Celsius. The tolerances related to temperature are usually required to be less than +/−10 degrees Celsius to make sure the cooling system works properly. The pressure of the cooling air stream shall be in the range of 15 to 40 bar, preferably in the range of 20 to 30 bar. Tolerances related to pressure are usually required to be less than +/−0.5 bar. In order to fulfill these pressure and temperature requirements, the cooling unit 24 is controlled depending on measurements of temperature and pressure at various locations (see below).

Figure 2B:
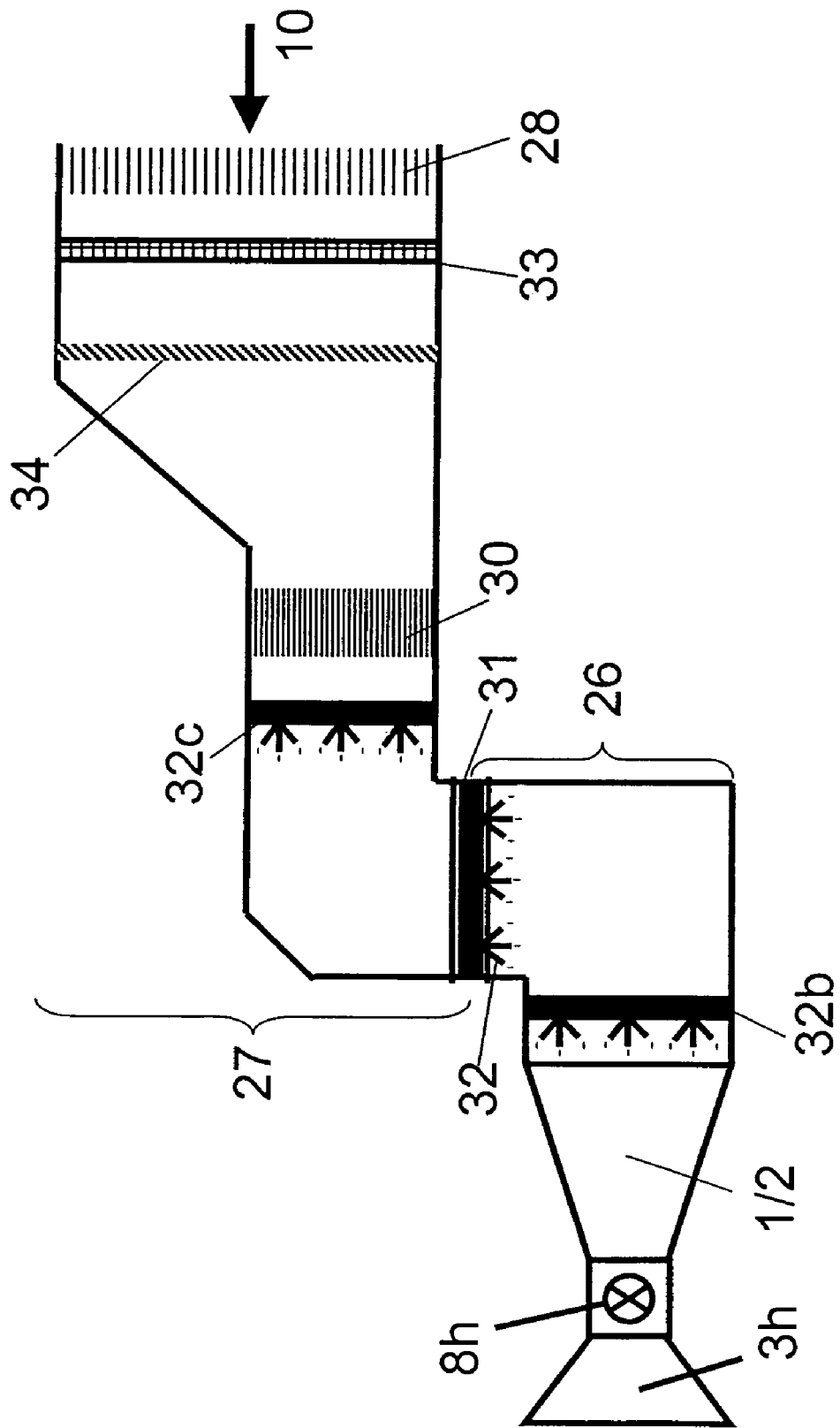

FIGS. 2a and 2b show the intake region of a gas turbine unit. Usually intake air 10 is aspired by a duct with large cross-section, which at the entrance is provided with a filter 28 to avoid deleterious entrance of dust and other particles. Right downstream of said filter a first evaporative air inlet cooling unit 29/33 is provided meaning any system adding liquid to the air inlet mass flow, which substantially evaporates before entering the compressor of the gas turbine unit, resulting in a cooling effect and in an increase of the air intake mass flow into the gas turbine unit. This may for example be in the form of a liquid atomization spray system ('fogging' system) 29 in FIG. 2a or in the form of a porous medium (evaporative cooler) 33 in FIG. 2b. The respective evaporative cooling system shall increase the humidity of the intake air as close to saturation as possible. Downstream of an evaporative cooler 33 a droplet catcher 34 preferably is provided to prevent excessively large droplets from entering the compressor of the gas turbine unit. It shall be mentioned that the injection spray device 29 can also be used to inject more liquid than needed for saturating the intake air mass flow to achieve the same effect as with using the over-fogging means 32 described below. Subsequently, the cross-section of the intake duct 27 is reduced thereby increasing the flow velocity of the intake air 10. Usually downstream of this reduction of cross-section there is a silencer installed in the intake duct. Downstream of the silencer the intake duct 27 is connected with the intake manifold 26 by means of an expansion joint 31. The intake manifold 26 is fixedly connected with the gas turbine unit and is therefore subject to vibrations of the gas turbine. By contrast, the intake duct 27 is directly connected to the ground and shall be affected by the gas turbine's vibrations as little as possible, which is achieved by providing an expansion joint 31 between the air intake manifold and the air intake duct. The location of the expansion joint 31 has been found to be quite a favorable position for placing the liquid droplet injection device 32a, but is not the exclusive location for the liquid droplet injection device (see below). Downstream of the liquid droplet injection device 32a, the intake manifold 26, which guides the intake air into the compressor as smoothly as possible, is connected to the entrance of the compressor 1/2, which in this case is a compressor without inter-cooling. Alternative locations for the liquid droplet injection device are e.g. at the compressor bellmouth as close to the compressor entrance as possible (32b) or behind the silencer (32c).

Both elements 29 and 32a/b/c preferably inject demineralized water in order to avoid depositions in the gas turbine unit. Typically 1.0 to 3.0 mass-% of water are added to the stream of intake air, and a water pressure of >100 bar is used.

Figure 3:
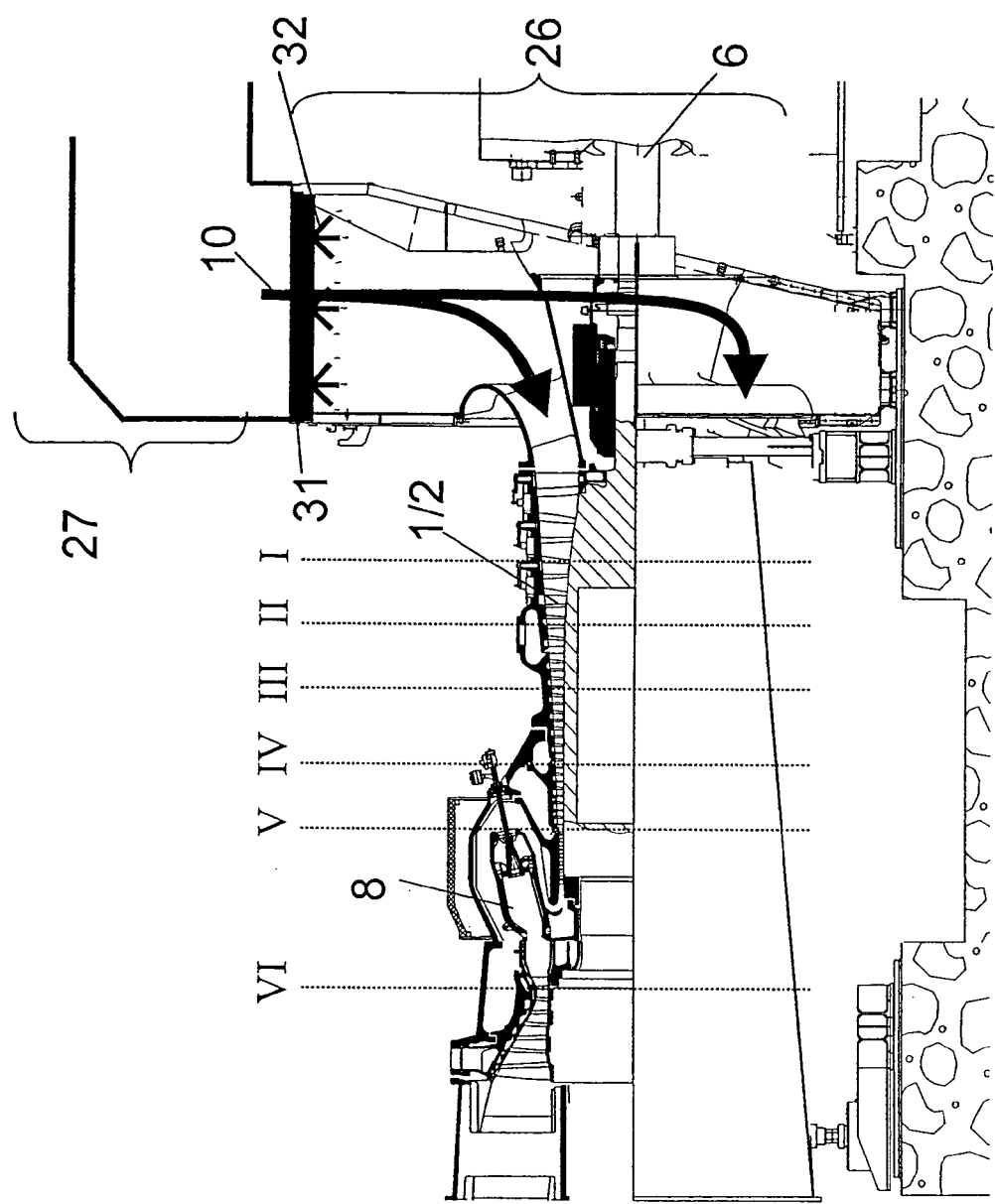
FIG. 3 is a detailed axial cut (upper half) through the intake region of a gas turbine unit showing the combustion chamber and the turbine stage.
Figure 4:
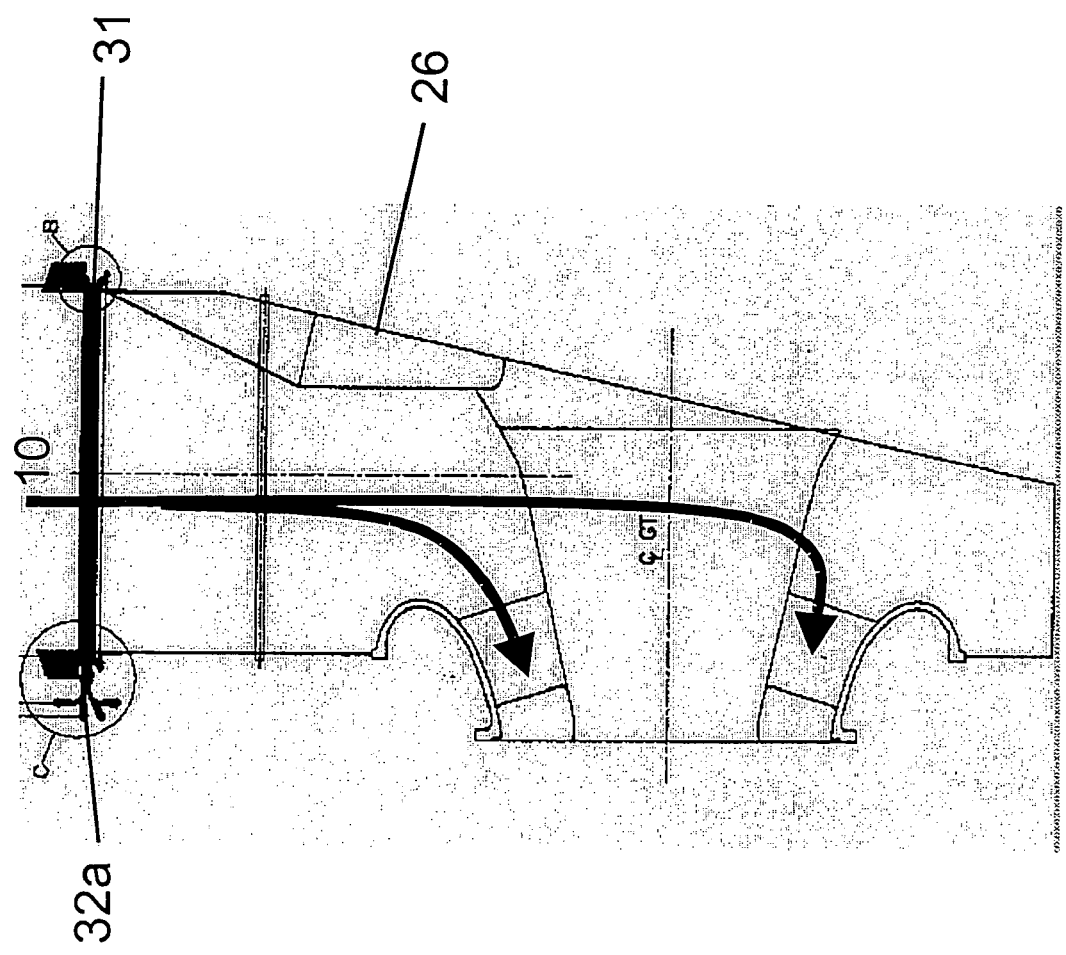
FIG. 4 shows the intake manifold of a gas turbine unit with a liquid droplet injection device installed in the expansion joint according to the present invention.

To visualize in more detail the conditions in the intake region of a gas turbine unit, FIG. 3 shows an axial cut through a gas turbine unit and in particular through its intake manifold 26. It can be seen that the liquid droplet injection device 32a is arranged substantially perpendicular to the flow of intake air 10 at the interface between the intake duct 27 and the intake manifold 26. Preferably, the liquid droplet injection device 32a is positioned on the intake duct side of the expansion joint 31. This positioning proves to be advantageous as it shows minimum exposure to vibration, low pressure loss of the equipment as well as even droplet distribution with small droplet sizes. The intake air is over-saturated by the liquid droplet injection device 32a, is then deviated by a particular, flow adapted housing (the intake manifold, FIG. 4) into the compressor 1/2, where the air is compressed in several steps but without inter-cooling. The temperature profile in the casing of the gas turbine unit should be monitored to avoid damages in case of irregularities.

Figure 5:
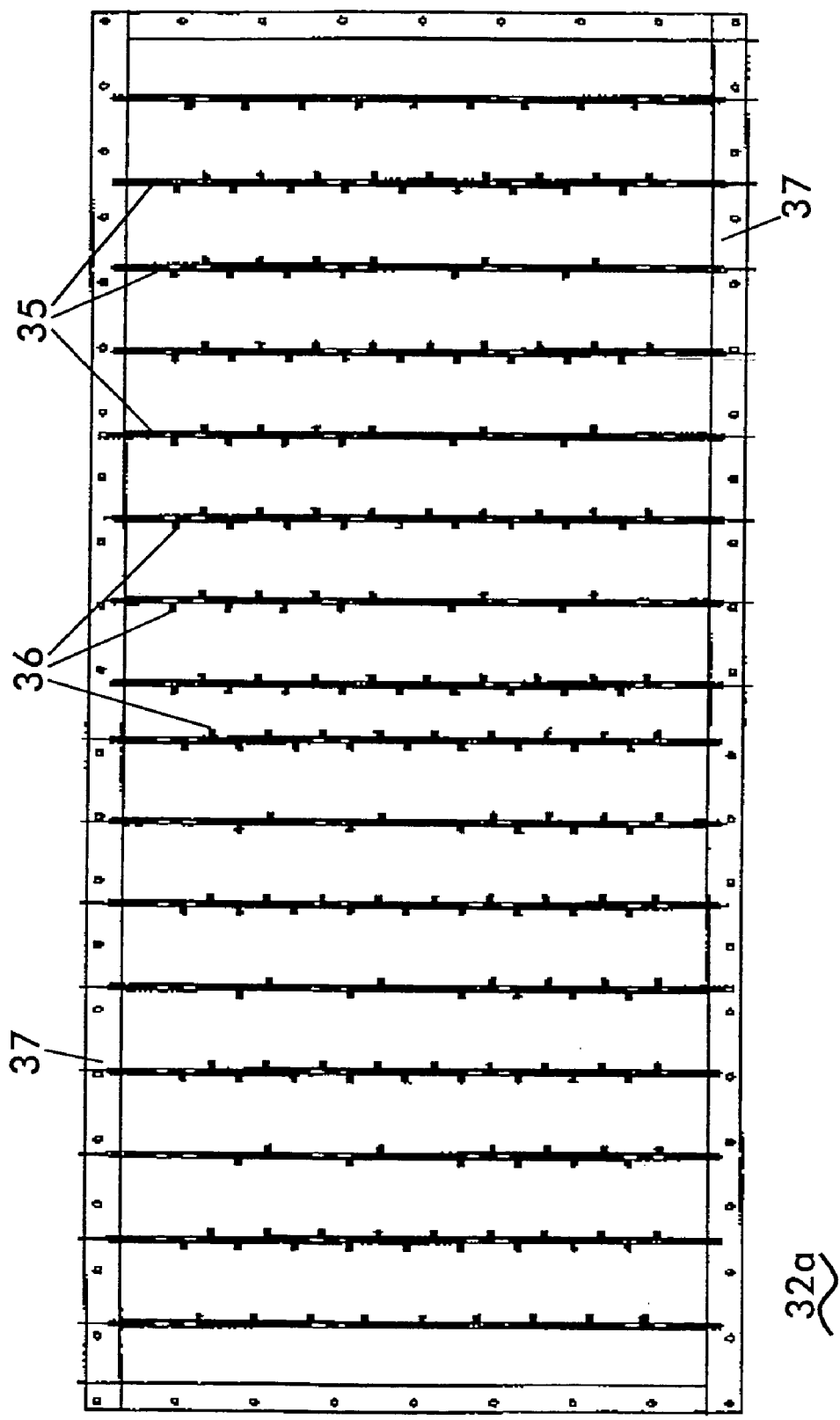
FIG. 5 shows a liquid droplet injection device used according to the present invention.

FIG. 5 shows a nozzle rack as it can be used as the liquid droplet injection device 32a. The rack consists of a carrying frame 37 onto which liquid ducts 35 are mounted, typically with a variable spacing in the range of approximately 20-30 cm. On these water ducts 35, liquid atomization nozzles 36 are mounted which allow a high flow capacity, good droplet cone and small droplet sizes thereby reducing blading erosion rates. Usually 5-15 nozzles are mounted on one water duct. As one can see from FIG. 5, the spacing of the nozzles as well as of the pipes is not necessarily regular. The positioning of the water ducts 35 as well as of the liquid atomization nozzles 36 should be in a flow weighted manner to provide even droplet distribution. For example in the case of an intake duct 27 and intake manifold 26 as displayed in FIG. 2a/b, where the intake air is diverted almost in a rectangular angle from a horizontal direction to a vertical direction in order to enter the intake manifold 26, the maximum of flow velocity in the region of the expansion joint measured substantially perpendicular to the flow of intake air is located closer to the outer side of the bend, with the velocity maximum usually located within the third proximal to the outer side of the bend. Usually the nozzle density can be set substantially proportional to the velocity at a particular position in order to achieve homogeneous distribution of fine droplets across the cross-section of the intake air stream. The above applies in the case where all the nozzles are identically fed with water so that when the nozzles are distributed according to the flow of the air, more water is injected in regions where there is a high flow velocity and where there is a higher density of nozzles. It is generally easier to achieve homogeneously high droplet quality if all nozzles are fed identically. However, the same effect can be achieved with evenly distributed nozzles and feeding nozzles, that are located in regions of high flow velocity, with more water. Also a combination of flow-adapted distribution of the nozzles with individual supply of the nozzles is possible and can be advantageous if the flow conditions in the duct vary significantly depending on the mode of operation of the gas turbine unit. The nozzles may be designed as binary nozzles fed with gas or quasi-gas and with liquid to provide good droplet quality.

As mentioned above, the over-fogging system can be combined with conventional evaporative air inlet cooling units as for example displayed by means 29 in FIG. 2a or 33 in FIG. 2b. The conditions for start-up of the over-fogging pumps are as follows: The gas turbine unit should be at or near full load and the ambient wet bulb temperature should be above a certain value, typically above 0° Celsius. If conventional evaporative inlet air cooling equipment is installed, the inlet air cooling devices should be operating when the over-fogging is being activated if ambient conditions allow. Additionally, the full or near full load operation of the gas turbine unit should have been active for a certain warm-up period, which should be in the range of preferably about 30 minutes. The compressor inlet temperature has to be monitored. If this value drops below a certain level, usually given by about 0° Celsius, an automatic shutdown of the liquid injection system is necessary. Also the over-fogging flow capacity has to be supervised to detect e.g. nozzle clogging, change in the nozzle flow capacity, leaks, differences between measured system water flow capacity etc., which would lead to uncontrolled water flows which should be avoided. As mentioned above, also the quality of feed water should be supervised. Generally quality is monitored by measuring the conductivity which should not exceed a certain limit value. In addition, any freezing or blocking of the pipes system also should be monitored.

For plants with inlet cooling systems the following start-up scheme proves to be suitable:

1. Gas turbine unit is loaded up to or near to full load.
2. If the gas turbine unit is at or near full load operation, evaporative inlet cooling systems come into operation if the ambient conditions allow switching on of the inlet cooling system.

3. After operating at or near full load for at least approximately 30 minutes, the over-fogging system can come into operation.

In case a plant is not equipped with an evaporative inlet cooling systems, the above step 2 can be skipped.

For shutdown, the above procedure can be carried out in the reverse order.

LIST OF REFERENCE NUMERALS 1 first stage of compressor (low-pressure)
2 second stage of compressor (high-pressure)
3 turbine
4 steam turbine
5 generator
6 common shaft
7 clutch
8 combustion chamber
9 fuel duct, fuel
10 intake air
11 partially compressed intake air
12 compressed air
13 hot combustion air
14 exhaust air
15 heat recovery steam generator
16 chimney
17 duct to the heat recovery steam generator
18 duct from the heat recovery steam generator (steam)
19 outlet of the steam turbine
20 cooling/fogging of intake air
21 cooling of partially compressed air
22 cooling air duct, compressed cooling air
23 droplet separator
24 cooling unit
25 cooled cooling air
26 intake manifold
27 intake duct
28 filter
29 fogging liquid droplet injection device
31 expansion joint
32a/b/c over-fogging liquid droplet injection device
33 evaporative cooler
34 droplet catcher
35 water duct
36 atomisation spray nozzle
37 carrying frame
38 fuel control valve
39 control signal line
20a valve
40 feed forward signal

What is claimed is:

1. A process for changing shaft power production from a gas turbine unit that comprises a compressor for compressing a stream of intake air supplied thereto and discharging compressed air, a combustion chamber in which fuel is combusted with the compressed air discharged from said compressor, and a turbine driven by hot combustion air discharged from said combustion chamber, the process comprising:

operating said compressor with a pressure ratio larger than 15 bar;

injecting liquid droplets into the stream of intake air using at least one liquid droplet injection device disposed on an upstream side of said compressor to increase shaft power generated by the gas turbine unit;

controlling the at least one liquid droplet injection device so that responsive to a desired increase of shaft power output, the at least one liquid droplet injection device delivers the liquid droplets to reach a discrete rate of mass flow within 60 seconds; and adjusting the fuel mass flow with a fuel control valve in order to maintain firing temperatures of the gas turbine unit, wherein the at least one liquid droplet injection device is operable with an on/off-control signal, and wherein the fuel control valve is controllable as a function of liquid droplet injection using a single feed forward signal synchronized to the on/off-control signal.

2. The process of claim 1, wherein liquid mass flow is substantially injected across the entire cross-section of an intake air guide.

3. The process of claim 1, further comprising cooling components of the gas turbine unit with a cooling system using at least partially compressed air discharged from the compressor, wherein the cooling system comprises a cooling unit that is controlled depending on quality with respect to temperature and pressure of air cooled thereby.

4. The process of claim 1, wherein between 0.5 mass % and 5 mass % of liquid are injected into the intake air to achieve an increase of shaft power of the gas turbine unit of up to 10%.

5. The process of claim 1, wherein the amount of liquid injected into the intake air is decreased by between 0.5 mass % and 5 mass % of liquid to achieve a reduction of shaft power of the gas turbine unit of up to 10%.

6. The process of claim 1, wherein between 1 mass % and 3 mass % of liquid are injected into the intake air to achieve an increase of shaft power of the gas turbine unit of up to 10%.

7. The process of claim 1, wherein the amount of liquid injected into the intake air is decreased by between 1 mass % and 3 mass % of liquid to achieve a reduction of shaft power of the gas turbine unit of up to 10%.

8. The process of claim 1, wherein water is injected at pressure as high as 250 bar water pressure, and the pressure is achieved within 1 second and 60 seconds.

9. The process of claim 8, wherein the pressure is achieved within 10 seconds and 30 seconds.

10. The process of claim 1, wherein water is injected at pressure between 100 bar and 180 bar water pressure, and the pressure is achieved within 1 second and 60 seconds.

11. The process of claim 10, wherein the pressure is achieved within 10 seconds and 30 seconds.

12. The process of claim 1, wherein water is injected at pressure about 140 bar water pressure, and the pressure is achieved within 1 second and 60 seconds.

13. The process of claim 12, wherein the pressure is achieved within 10 seconds and 30 seconds.

14. The process of claim 1, wherein the power output of the gas turbine unit available on a generator coupled to the gas turbine unit is rapidly increased or decreased using an addition or reduction of liquid mass flow.

15. The process of claim 14, wherein the rapid increase or decrease is generated in response to a fast increase or decrease in power demand of an electricity grid coupled to the gas turbine unit, and by an addition or reduction of water a surge margin of the compressor is increased or decreased by cooling a compressor blade section.

16. The process of claim 15, wherein the rapid increase or decrease is generated in response to a drop or rise of frequency of the electricity grid.

17. The process of claim 16, wherein the drop or rise of the frequency of the electricity grid results in a reduction or augmentation of shaft speed of the gas turbine unit.

18. The process of claim 1, wherein the liquid droplets are injected after a delay of between 15 minutes and 45 minutes after starting up the gas turbine to full load.

19. The process of claim 18, wherein the liquid droplets are injected after a delay of about 30 minutes after starting up the gas turbine to full load.

20. The process of claim 18, wherein additional cooling systems are switched on after a delay of between 15 minutes and 45 minutes after starting up the gas turbine to full load.

21. The process of claim 1, wherein the single feed forward signal and the on/off-control signal are synchronized but displaced relative to each other sufficient to account for hysteresis-effects of the gas turbine unit.

* * * * *